(12) United States Patent
Merry et al.

(10) Patent No.: US 10,634,055 B2
(45) Date of Patent: Apr. 28, 2020

(54) GAS TURBINE ENGINE HAVING SECTION WITH THERMALLY ISOLATED AREA

(71) Applicant: UNITED TECHNOLOGIES CORPORATION, Hartford, CT (US)

(72) Inventors: Brian D. Merry, Andover, CT (US); Gabriel L. Suciu, Glastonbury, CT (US); James D. Hill, Tolland, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 513 days.

(21) Appl. No.: 14/614,785

(22) Filed: Feb. 5, 2015

(65) Prior Publication Data

US 2016/0230661 A1    Aug. 11, 2016

(51) Int. Cl.
*F02C 7/18* (2006.01)
*F01D 5/08* (2006.01)
*F02C 3/107* (2006.01)
*F02C 3/10* (2006.01)

(52) U.S. Cl.
CPC ................ *F02C 7/18* (2013.01); *F01D 5/08* (2013.01); *F01D 5/081* (2013.01); *F01D 5/082* (2013.01); *F01D 5/088* (2013.01); *F02C 3/10* (2013.01); *F02C 3/107* (2013.01); *F05D 2220/3217* (2013.01); *F05D 2220/3219* (2013.01); *F05D 2250/411* (2013.01)

(58) Field of Classification Search
CPC ..... F05D 2220/3217; F05D 2220/3219; F05D 2250/411; F01D 5/088; F01D 5/08
See application file for complete search history.

(56) References Cited

U.S. PATENT DOCUMENTS

| 3,034,298 | A | 5/1962  | White             |
| 3,918,832 | A | 11/1975 | Shuttleworth et al. |
| 4,094,673 | A | 6/1978  | Erickson          |
| 4,139,376 | A | 2/1979  | Erickson et al.   |
| 4,155,755 | A | 5/1979  | Sara              |
| 4,251,272 | A | 2/1981  | Sara et al.       |
| 4,659,285 | A | 4/1987  | Kalogeros et al.  |
| 4,884,950 | A | 12/1989 | Brodell et al.    |
| 4,897,021 | A | 1/1990  | Chaplin et al.    |
| 4,936,745 | A | 6/1990  | Vine et al.       |
| 5,017,402 | A | 5/1991  | McComas et al.    |

(Continued)

FOREIGN PATENT DOCUMENTS

| EP | 0318026 A1 | 5/1989 |
| EP | 0867599 B1 | 7/2007 |

(Continued)

OTHER PUBLICATIONS

European Search Report for European Application No. 16154312.9 dated Jul. 11, 2016.

*Primary Examiner* — Umashankar Venkatesan
(74) *Attorney, Agent, or Firm* — Carlson, Gaskey & Olds, P.C.

(57) ABSTRACT

A gas turbine engine according to an exemplary aspect of the present disclosure includes, among other things, a first compressor having a first overall pressure ratio, and a second compressor having a second overall pressure ratio. A ratio of the first overall pressure ratio to the second overall pressure ratio is greater than or equal to about 2.0. Further, a section of the gas turbine engine includes a thermally isolated area.

20 Claims, 3 Drawing Sheets

(56) References Cited

U.S. PATENT DOCUMENTS

| | | |
|---|---|---|
| 5,024,884 A | 6/1991 | Otfinoski et al. |
| 5,232,339 A | 8/1993 | Plemmons et al. |
| 5,350,557 A | 9/1994 | Jarrabet |
| 5,402,636 A | 4/1995 | Mize et al. |
| 5,655,701 A | 8/1997 | Quattrocchi et al. |
| 5,780,116 A | 7/1998 | Sileo et al. |
| 6,089,825 A | 7/2000 | Walden et al. |
| 6,183,193 B1 * | 2/2001 | Glasspoole ............ F01D 5/08 415/115 |
| 6,283,712 B1 * | 9/2001 | Dziech ............ F01D 5/066 415/115 |
| 6,352,264 B1 | 3/2002 | Dalzell, Jr. et al. |
| 6,672,072 B1 * | 1/2004 | Giffin, III ............ F01D 5/08 60/728 |
| 6,735,956 B2 | 5/2004 | Romani |
| 6,899,339 B2 | 5/2005 | Sanders et al. |
| 7,032,904 B2 | 4/2006 | Rogers |
| 7,465,148 B2 * | 12/2008 | Klinger ............ F01D 5/08 415/107 |
| 7,669,425 B2 * | 3/2010 | Liang ............ F01D 5/088 415/115 |
| 7,926,289 B2 * | 4/2011 | Lee ............ F01D 5/081 415/145 |
| 7,950,900 B2 | 5/2011 | Mulcaire et al. |
| 8,277,174 B2 * | 10/2012 | Hasel ............ F02C 3/107 415/122.1 |
| 2008/0260523 A1 | 10/2008 | Alvanos et al. |
| 2009/0238683 A1 | 9/2009 | Alvanos et al. |
| 2013/0061600 A1 * | 3/2013 | Anand ............ F02C 7/18 60/780 |
| 2013/0177387 A1 | 7/2013 | Rioux |
| 2015/0354455 A1 * | 12/2015 | Suciu ............ F02C 3/04 60/782 |

FOREIGN PATENT DOCUMENTS

| | | |
|---|---|---|
| EP | 2105581 A2 | 9/2009 |
| EP | 2206882 A2 | 7/2010 |
| EP | 2535523 A2 | 12/2012 |
| EP | 2615256 A1 | 7/2013 |
| EP | 2620597 A1 | 7/2013 |
| WO | 0071854 A1 | 11/2000 |

* cited by examiner

GAS TURBINE ENGINE HAVING SECTION WITH THERMALLY ISOLATED AREA

BACKGROUND

Gas turbine engines typically include a compressor section, a combustor section, and a turbine section. The compressor and turbine sections may include alternating series of rotating blades and stationary vanes that extend into the core airflow path of the gas turbine engine.

During operation of the gas turbine engine, the components of the turbine section are typically cooled with cooling fluid. In one known example, the components of a high pressure turbine are cooled by multiple, separate flows of cooling fluid provided to various areas of the high pressure turbine section. The separate flows of cooling fluid are from different sources and are independently directed to various areas of the high pressure turbine section (e.g., they do not mix).

SUMMARY

A gas turbine engine according to an exemplary aspect of the present disclosure includes, among other things, a first compressor having a first overall pressure ratio, and a second compressor having a second overall pressure ratio. A ratio of the first overall pressure ratio to the second overall pressure ratio is greater than or equal to about 2.0. Further, a section of the gas turbine engine includes a thermally isolated area.

In a further non-limiting embodiment of the foregoing gas turbine engine, the ratio of the first overall pressure ratio to the second overall pressure ratio is greater than about 3.0.

In a further non-limiting embodiment of the foregoing gas turbine engine, the ratio of the first overall pressure ratio to the second overall pressure ratio is less than or equal to about 6.0.

In a further non-limiting embodiment of the foregoing gas turbine engine, the engine further includes a low speed spool connecting the first compressor and a low pressure turbine rotor, and a high speed spool connecting the second compressor and a high pressure turbine rotor. The high pressure turbine rotor includes first and second rotor disks provided within the thermally isolated area.

In a further non-limiting embodiment of the foregoing gas turbine engine, the thermally isolated area is bounded at a fore location, an aft location, a radially inner location, and a radially outer location.

In a further non-limiting embodiment of the foregoing gas turbine engine, the thermally isolated area is bounded at the fore location by at least one fore wall extending from a tangential onboard injector (TOBI) and a fore seal provided between the at least one fore wall and a fore-extending flange of the first rotor disk.

In a further non-limiting embodiment of the foregoing gas turbine engine, the thermally isolated area is bounded at a radially outer location by a first outer seal extending from the first rotor disk, a second outer seal between the first and second rotor disk, and a third outer seal extending from the second rotor disk.

In a further non-limiting embodiment of the foregoing gas turbine engine, the thermally isolated area is bounded at an aft location by an aft wall between a core airflow path boundary structure and an aft seal between the aft wall and an aft-extending flange of the second rotor disk.

In a further non-limiting embodiment of the foregoing gas turbine engine, the third outer seal extends between the second rotor disk and the aft wall.

In a further non-limiting embodiment of the foregoing gas turbine engine, the thermally isolated area is bounded at a radially inner location by a spool.

In a further non-limiting embodiment of the foregoing gas turbine engine, the thermally isolated area is provided with a flow of cooling fluid from a single inlet.

In a further non-limiting embodiment of the foregoing gas turbine engine, the single inlet is a tangential onboard injector (TOBI).

In a further non-limiting embodiment of the foregoing gas turbine engine, the flow of cooling fluid is provided from a common source.

In a further non-limiting embodiment of the foregoing gas turbine engine, the source is a location downstream of the second compressor and upstream of a combustor.

In a further non-limiting embodiment of the foregoing gas turbine engine, the flow of cooling fluid flows through a heat exchanger before entering the thermally isolated area.

In a further non-limiting embodiment of the foregoing gas turbine engine, the thermally isolated area is radially inward of a core airflow path of the gas turbine engine.

A gas turbine engine according to another exemplary aspect of the present disclosure includes, among other things, a first compressor having a first overall pressure ratio, and a second compressor having a second overall pressure ratio. A ratio of the first overall pressure ratio to the second overall pressure ratio is greater than or equal to about 2.0. Further, a section of the gas turbine engine includes a first rotor disk supporting a first array of rotor blades, a second rotor disk supporting a second array of rotor blades, and a thermally isolated area bounded at a fore location, an aft location, a radially inner location, and a radially outer location. The thermally isolated area has a single, common inlet for receiving a flow of cooling fluid. The first and second rotor disks are provided within the thermally isolated area, and the thermally isolated area is arranged such that the flow of cooling fluid exits the thermally isolated area via the first and second arrays of rotor blades.

In a further non-limiting embodiment of the foregoing gas turbine engine, the ratio of the first overall pressure ratio to the second overall pressure ratio is greater than about 3.0.

In a further non-limiting embodiment of the foregoing gas turbine engine, the ratio of the first overall pressure ratio to the second overall pressure ratio is less than or equal to about 6.0.

In a further non-limiting embodiment of the foregoing gas turbine engine, the first compressor is a low pressure compressor, the second compressor is a high pressure compressor, and the section is a high pressure turbine section.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows.

DETAILED DESCRIPTION

Figure 1:
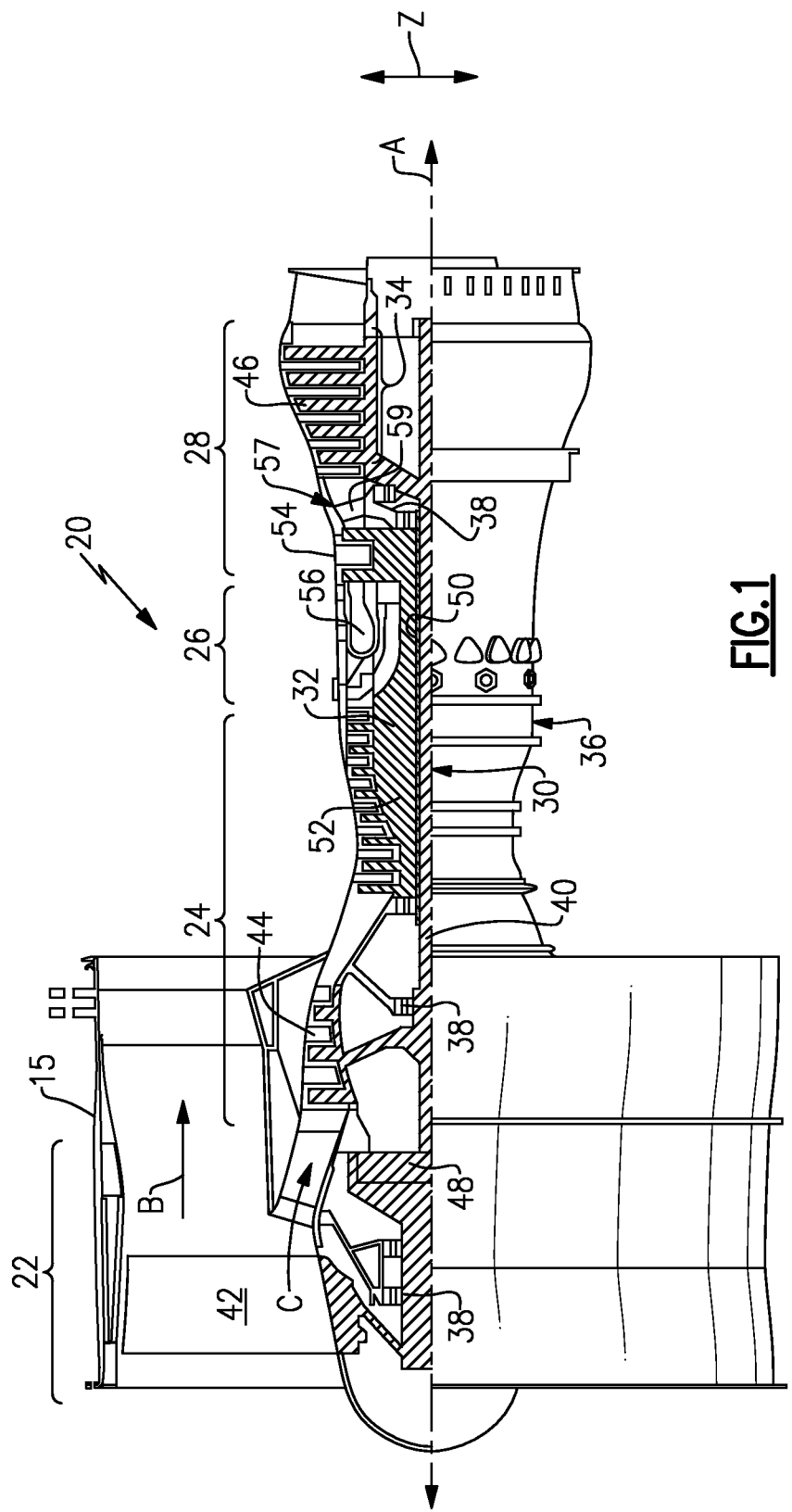
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core airflow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

Figure 2:
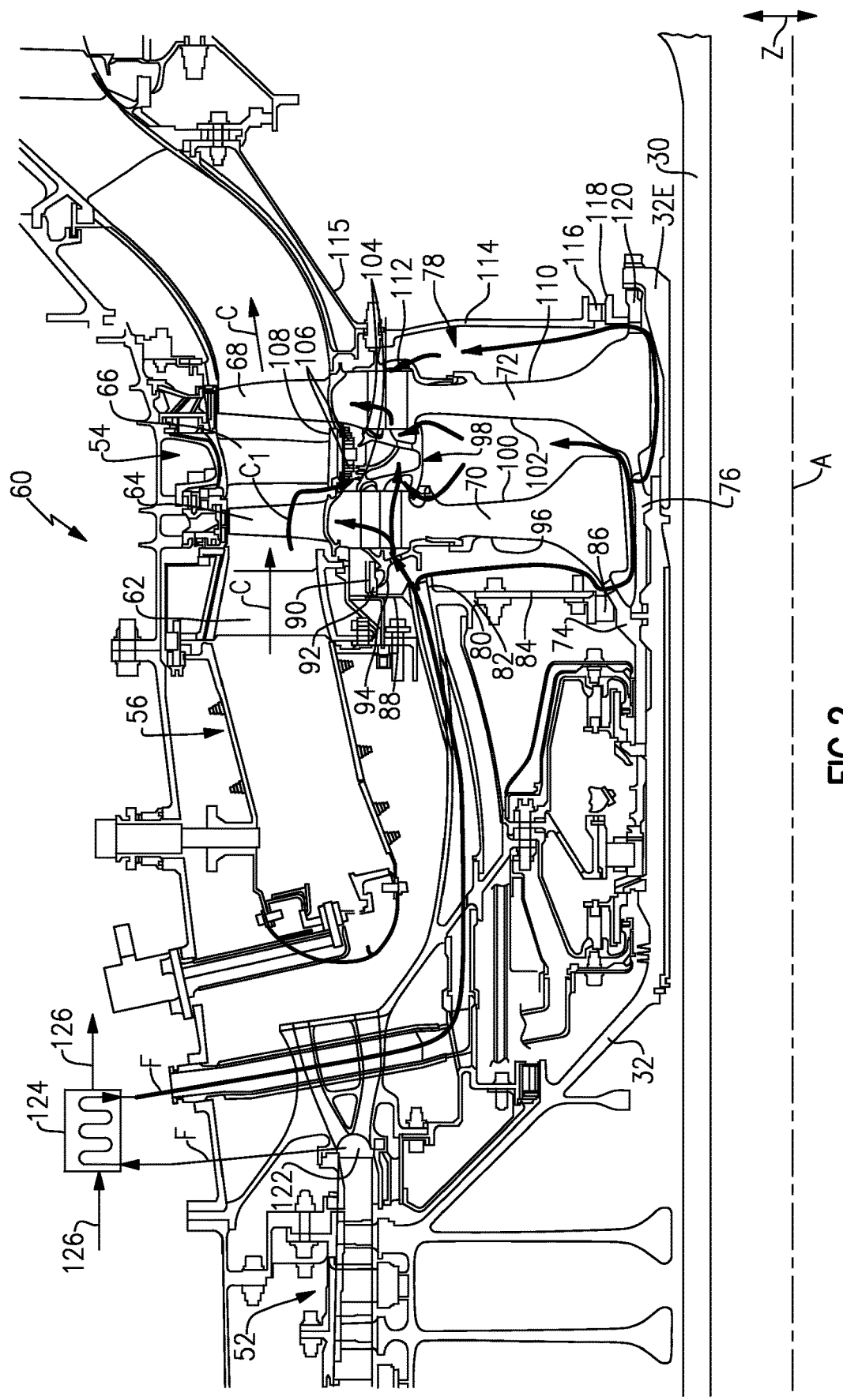
FIG. 2 illustrates a portion of a gas turbine engine.

FIG. 2 illustrates a portion 60 of a gas turbine engine. In this example, the portion 60 includes the high pressure compressor 52, the high pressure turbine 54, and the combustor 56. As mentioned above, the high pressure compressor 52 and the high pressure turbine are coupled to the high speed spool 32.

Downstream of the combustor 56, the high pressure turbine 54 includes a first stage having a first array of stator vanes 62 and a first array of rotor blades 64. The high pressure turbine 54 further includes a second stage having a second array of stator vanes 66 and a second array of rotor blades 68. The first array of rotor blades 64 are rotatably mounted to a first rotor disk 70, and the second array of rotor blades 68 are rotatably mounted to a second rotor disk 72.

In this example, the first rotor disk 70 includes a fore-extending flange 74 at a radially inner location (relative to the radial direction Z, which is normal to the engine central longitudinal axis A) for engaging the high speed spool 32. The second rotor disk 72 likewise includes a fore-extending flange 76 that extends radially inward of the first rotor disk 70 and also engages the high speed spool 32.

The high pressure turbine 54 includes a thermally isolated area 78 radially inward of the core airflow path C. In this example, the thermally isolated area 78 is provided with a flow of cooling fluid F from a common, single source (such as the high pressure compressor 52, discussed below). The flow of cooling fluid F is directed into the thermally isolated area 78 by way of a common, single inlet, which in this example is a tangential onboard injector (TOBI) 80.

The thermally isolated area 78 is bounded at fore, aft, radially inner, and radially outer locations by a plurality of walls and seals. The flow of cooling fluid F that enters the thermally isolated area 78 via the TOBI 80 ultimately exits the thermally isolated area 78 by seal leakages and through the first and second arrays of rotor blades 64, 66, and enters the core airflow path C. Additionally, the fluid from the core airflow path C is substantially prevented from entering the thermally isolated area 78. One example sealing arrangement for the thermally isolated area 78 is discussed below.

In this example, the thermally isolated area 78 is bounded at a fore location by a first fore wall 82 extending radially inward from the TOBI 80. The first fore wall 82 is connected, in this example, to a second fore wall 84. The second fore wall 84 is in turn sealed against the fore-extending flange 74 by way of a fore seal 86. The TOBI 80 also includes a third fore wall 88 which extends radially outward from the TOBI 80.

In this example, the thermally isolated area 78 is bounded at the radially outer location by an aft-extending platform 90, which projects from the third fore wall 88. The aft-extending platform 90 supports an abradable material 92 on a radially inner surface thereof. A first outer seal 94, which in this example includes a plurality of knife edges configured to engage the abradable material 92, extends from a fore surface 96 of the first rotor disk 70.

Continuing along the radially outer boundary, a second outer seal 98 spans between an aft surface 100 of the first rotor disk 70 and a fore surface 102 of the second rotor disk 72. At a radially outer location, the second outer seal 98 includes knife edges 104 that are configured to engage abradable material 106 supported on a radially inner platform 108 of the second array of stator vanes 66. The second outer seal 98 is configured to prevent a flow of fluid $C_1$ from the core airflow path C from entering the thermally isolated area 78. One example type of seal 98 that spans between adjacent rotor disks is a circumferentially segmented seal, as described in International Patent Application No. PCT/US2014/64956, filed on Nov. 11, 2014, the entirety of which is herein incorporated by reference.

An aft surface 110 of the second rotor disk 72 supports a third outer seal 112, which extends in an aft-direction and abuts against a radially extending aft wall 114. The aft wall 114 extends between a core airflow path boundary wall 115 and the high speed spool 32. In particular, at a radially inner location, the aft flange 114 is connected to a seal 116, which seals against a flange 118 projecting from an aft-extending flange 120 of the second rotor disk 72.

At the radially inner location, the thermally isolated area 78 is bounded by the high speed spool 32 and an end portion 32E of the high speed spool 32. The end portion 32E extends from an aft end of the high speed spool 32 and is coupled to the aft-extending flange 120 of the second rotor disk 72.

By providing the boundaries for the thermally isolated area 78 discussed above, the high pressure turbine 54 can be cooled to a desired level. In some examples, the components in the high pressure turbine 54 can be cooled below the maximum rated use temperatures of those components. In other words, the components can be "overcooled." As discussed below, there are several benefits to the gas turbine engine 20 when the components are overcooled.

Figure 3:
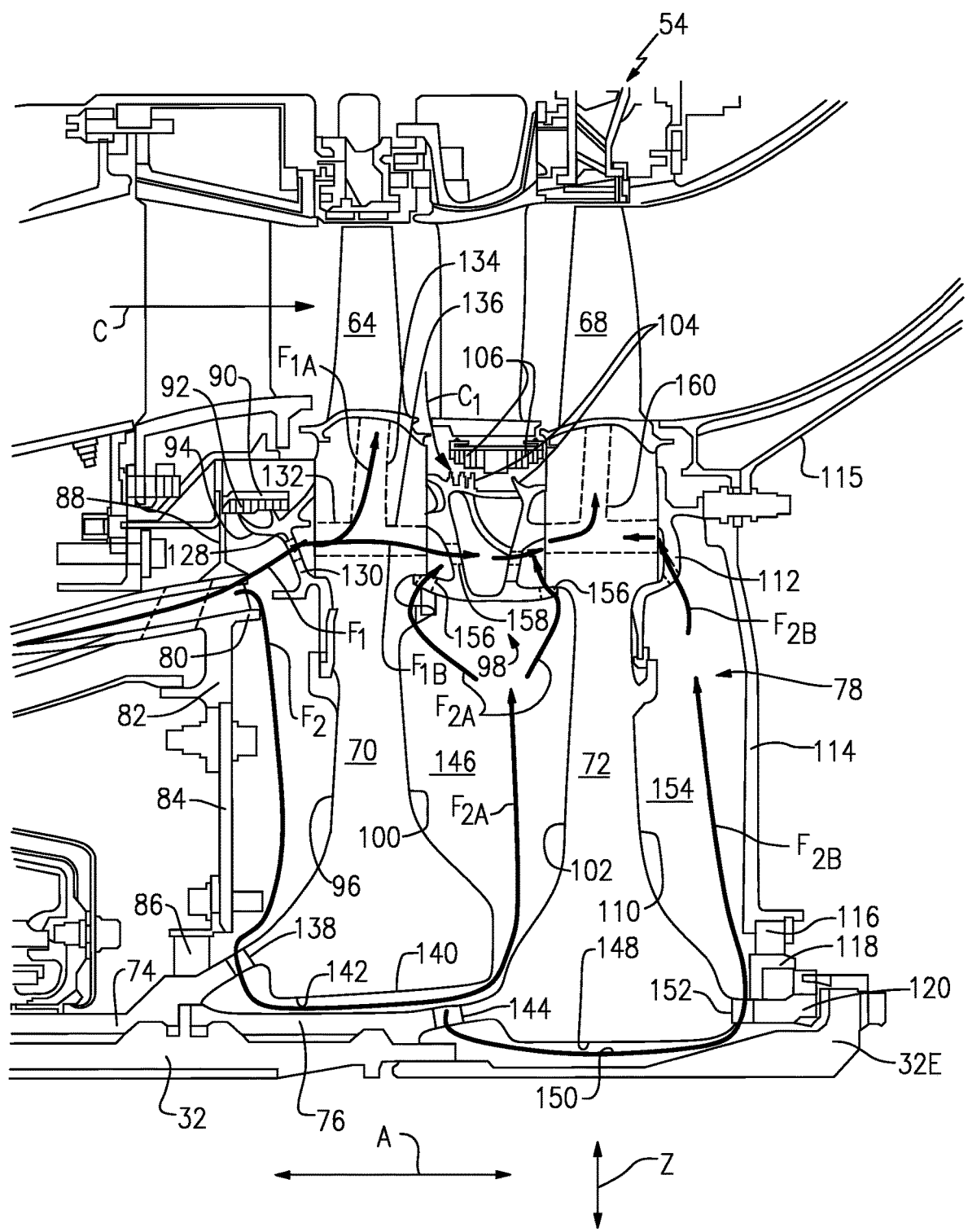
FIG. 3 is a close-up view of FIG. 2 and illustrates the detail of the high pressure turbine section of the gas turbine engine.

One example arrangement for routing the cooling fluid F to, and within, the thermally isolated area 78 will now be described. With joint reference to FIG. 2 and FIG. 3 (which perhaps more clearly illustrates the detail of the example cooling arrangement within the thermally isolated area 78), a flow of cooling fluid F is sourced from a location 122 downstream of the high pressure compressor 52 and upstream of the combustor 54. The flow of cooling fluid F is directed toward a heat exchanger 124 in this example. At the heat exchanger 124, the fluid F is cooled by interaction with a flow of a relatively cooler fluid 126, which in one example is fluid from the bypass flow path B. The heat exchanger 124 is optional, and is not included in all examples, although the heat exchanger has the benefit of providing lower cooling fluid F temperatures.

Downstream of the heat exchanger 124, the cooling fluid F is directed to the TOBI 80. Downstream of the TOBI 80, the cooling fluid F enters the thermally isolated area 78, and splits into a first stream $F_1$ and a second stream $F_2$. The first stream $F_1$ flows through an orifice 128 in an angled wall 130 in the first outer seal 94. Downstream of the orifice 128, the first stream $F_1$ enters an internal passageway 132 in the first rotor disk 70. The internal passageway 132 splits the first stream $F_1$ into a first portion $F_{1A}$ and a second portion $F_{1B}$. The first portion $F_{1A}$ is directed through a radial passageway 134 and to the first array of rotor blades 64 to cool them. The second portion $F_{1B}$ flows through an axial passageway 136 toward the seal 98. Downstream of the first array of rotor blades 64, the cooling fluid enters the core airflow path C.

The second stream $F_2$ does not enter the orifice 130 and, instead, is radially turned and flows along the fore surface 96 of the first rotor disk 70 toward the high speed spool 32. In this example, the second stream $F_2$ then enters an orifice 138 in the fore-extending flange 74 of the first rotor disk 70. Downstream of the orifice 138, the second stream $F_2$ flows through a passageway 140 between a radially inner surface 142 of the first rotor disk 70 and the fore-extending flange 76 of the second rotor disk 72.

In this example, the fore-extending flange 76 of the second rotor disk 72 includes an orifice 144. A first portion $F_{2A}$ of the second stream $F_2$ flows beyond the orifice 144 without entering it, and enters a space 146 axially between the first rotor disk 70 and the second rotor disk 72. A second portion $F_{2B}$ of the second stream $F_2$ enters the orifice 144 and flows between a radially inner surface 148 of the second rotor disk 72 and the radially outer surface 150 of the end portion 32E of the high speed spool 32. The aft-extending flange 120 of the second rotor disk 72 includes an orifice 152 which allows the second portion $F_{2B}$ to enter a space 154 between the aft surface 110 of the second rotor disk 72 and the aft wall 114.

The seal 98 includes radially inner orifices 156 to allow the first portion $F_{2A}$ of the second stream $F_2$ to enter the seal 98. Within the seal 98, the streams $F_{1B}$ and $F_{2A}$ merge and flow through interior orifices 158 toward an internal passageway 160 within the second rotor disk 72. Within the internal passageway 160, the second portion $F_{2B}$ of the second stream $F_2$ merges with the combined streams $F_{1B}$ and $F_{2A}$, and is directed to the second array of rotor disks 68 to cool them. The cooling fluid exits the second array of rotor blades 68 and flows into the core airflow path C.

In one example, when the flow of cooling fluid F is sourced from the high pressure compressor 52 at location 122, its temperature is between about 1250° F. and 1300° F. (about 676° C. to 704° C.). Downstream of the heat exchanger 124, the temperature of the flow of cooling fluid F is about 400° F. (about 204° C.). At the TOBI 80, the temperature of the flow of cooling fluid F is about 800° F. (about 427° C.).

Providing the cooling fluid F into the thermally isolated area 78 at this temperature allows for the components within the high pressure turbine 54 to be "overcooled." For example, in prior systems, the components of the high pressure turbine 54 are typically cooled only to the maximum rated use temperature of nickel-based alloys, which is between about 1250° F. and 1300° F. (about 676° C. to 704° C.). The cooling scheme discussed herein is capable of cooling the engine components well below—and, in one example, about 200° F. (about 93° C.) below—the maximum rated use temperature of the components.

With this enhanced cooling, the gas turbine engine 20 can essentially run "hotter." That is, the temperature of the fluid within the core flow path C at the exit of the compressor section, sometimes referred to as "T3," can be increased. This increase in compressor exit temperature allows the gas turbine engine 20 to operate at a higher engine fuel efficiency. Additionally, the size of various engine components (e.g., the rotor disks 70, 72) could be reduced without a reduction in thrust, again, relative to engines that operate at lower temperatures.

Another benefit of the cooling scheme discussed above is that the high speed spool 32 does not rotate as fast as it does in prior systems, which reduces the stress in the rotating components of the engine. In one example, the low pressure compressor 44 has a first overall pressure ratio, and the high pressure compressor 52 has a second overall pressure ratio. The ratio of the first overall pressure ratio to the second overall pressure ratio is greater than or equal to about 2.0. More narrowly, the ratio of the first overall pressure ratio to the second overall pressure ratio is greater than about 3.0. Even more particularly, the ratio of the first overall pressure ratio to the second overall pressure ratio is less than or equal to about 6.0. In the prior systems, the ratio of the low pressure compressor pressure ratio to the high pressure compressor pressure ratio is generally closer to 0.1 to 0.5. Known three spool engines typically have a ratios of between 0.9 and 3.0.

In other words, in this disclosure, a good deal more work can be done by the low pressure compressor 44 than the high pressure compressor 52. In prior systems, however, the high speed spool rotates at substantially high speeds. In this disclosure, given the cooling scheme discussed above, the mechanical requirements for the high speed spool are relaxed.

Moreover, the overall core size of the combined compressor sections 44, 52 may be reduced relative to the prior art. The disclosed gas turbine engine 20 creates a smaller core engine and yields higher overall pressure ratios and, therefore, better fuel consumption.

It should be understood that terms such as "fore," "aft," "axial," "radial," and "circumferential" are used above with reference to the normal operational attitude of the engine 20. Further, these terms have been used herein for purposes of explanation, and should not be considered otherwise limiting. Terms such as "generally," "substantially," and "about" are not intended to be boundaryless terms, and should be interpreted consistent with the way one skilled in the art would interpret the term.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A gas turbine engine, comprising:
a first compressor having a first overall pressure ratio, the first compressor being a low pressure compressor;
a second compressor having a second overall pressure ratio, the second compressor being a high pressure compressor downstream of the first compressor, wherein a ratio of the first overall pressure ratio to the second overall pressure ratio is greater than or equal to 2.0; and
wherein a section of the gas turbine engine includes a thermally isolated area.

2. The gas turbine engine as recited in claim 1, wherein the ratio of the first overall pressure ratio to the second overall pressure ratio is greater than 3.0.

3. The gas turbine engine as recited in claim 2, wherein the ratio of the first overall pressure ratio to the second overall pressure ratio is less than or equal to 6.0.

4. The gas turbine engine as recited in claim 1, further comprising:
a low speed spool connecting the first compressor and a low pressure turbine rotor;
a high speed spool connecting the second compressor and a high pressure turbine rotor, wherein the high pressure turbine rotor includes first and second rotor disks provided within the thermally isolated area.

5. The gas turbine engine as recited in claim 4, wherein the thermally isolated area is bounded at a fore location, an aft location, a radially inner location, and a radially outer location.

6. The gas turbine engine as recited in claim 5, wherein the thermally isolated area is bounded at the fore location by at least one fore wall extending from a tangential onboard injector (TOBI) and a fore seal provided between the at least one fore wall and a fore-extending flange of the first rotor disk.

7. The gas turbine engine as recited in claim 5, wherein the thermally isolated area is bounded at a radially outer location by a first outer seal extending from the first rotor disk, a second outer seal between the first and second rotor disk, and a third outer seal extending from the second rotor disk.

8. The gas turbine engine as recited in claim 7, wherein the thermally isolated area is bounded at an aft location by an aft wall between a core airflow path boundary structure and an aft seal between the aft wall and an aft-extending flange of the second rotor disk.

9. The gas turbine engine as recited in claim 8, wherein the third outer seal extends between the second rotor disk and the aft wall.

10. The gas turbine engine as recited in claim 5, wherein the thermally isolated area is bounded at a radially inner location by a spool.

11. The gas turbine engine as recited in claim 4, wherein the thermally isolated area is provided with a flow of cooling fluid from a single inlet.

12. The gas turbine engine as recited in claim 11, wherein the single inlet is a tangential onboard injector (TOBI).

13. The gas turbine engine as recited in claim 11, wherein the flow of cooling fluid is provided from a common source.

14. The gas turbine engine as recited in claim 13, wherein the source is a location downstream of the second compressor and upstream of a combustor.

15. The gas turbine engine as recited in claim 14, wherein the flow of cooling fluid flows through a heat exchanger before entering the thermally isolated area.

16. The gas turbine engine as recited in claim 1, wherein the thermally isolated area is radially inward of a core airflow path of the gas turbine engine.

17. A gas turbine engine, comprising:
a first compressor having a first overall pressure ratio, wherein the first compressor is a low pressure compressor;
a second compressor having a second overall pressure ratio, wherein the second compressor is a high pressure compressor downstream of the first compressor, wherein a ratio of the first overall pressure ratio to the second overall pressure ratio is greater than or equal to 2.0;
a section of the gas turbine engine including:
a first rotor disk supporting a first array of rotor blades;
a second rotor disk supporting a second array of rotor blades;
a thermally isolated area bounded at a fore location, an aft location, a radially inner location, and a radially outer location, the thermally isolated area having a single, common inlet for receiving a flow of cooling fluid;
wherein the first and second rotor disks are provided within the thermally isolated area; and
wherein the thermally isolated area is arranged such that the flow of cooling fluid exits the thermally isolated area via the first and second arrays of rotor blades.

18. The gas turbine engine as recited in claim 17, wherein the ratio of the first overall pressure ratio to the second overall pressure ratio is greater than 3.0.

19. The gas turbine engine as recited in claim 17, wherein the ratio of the first overall pressure ratio to the second overall pressure ratio is less than or equal to 6.0.

20. The gas turbine engine as recited in claim 17, wherein the section is a high pressure turbine section.

* * * * *